United States Patent
Markov et al.

(10) Patent No.: US 8,462,323 B2
(45) Date of Patent: Jun. 11, 2013

(54) INTEGRATED MULTI-SENSOR SURVEILLANCE AND TRACKING SYSTEM

(75) Inventors: Vladimir B. Markov, Irvine, CA (US); Anatoliy I. Khizhnyak, Irvine, CA (US)

(73) Assignee: MetroLaser, Inc., Laguna Hills, CA (US)

( * ) Notice: Subject to any disclaimer, the term of this patent is extended or adjusted under 35 U.S.C. 154(b) by 451 days.

(21) Appl. No.: 12/057,254

(22) Filed: Mar. 27, 2008

(65) Prior Publication Data
US 2009/0147238 A1    Jun. 11, 2009

Related U.S. Application Data

(60) Provisional application No. 60/908,326, filed on Mar. 27, 2007.

(51) Int. Cl.
*G01N 21/00* (2006.01)
(52) U.S. Cl.
USPC ............................................................. 356/73

(58) Field of Classification Search
USPC ........................................... 356/3, 300, 72–73
See application file for complete search history.

(56) References Cited

U.S. PATENT DOCUMENTS

| | | | |
|---|---|---|---|
| 6,034,811 A * | 3/2000 | Seaver ........................... | 359/305 |
| 6,653,971 B1 * | 11/2003 | Guice et al. ..................... | 342/54 |
| 2007/0162669 A1 * | 7/2007 | Martin et al. ................... | 710/72 |

\* cited by examiner

*Primary Examiner* — Tarifur Chowdhury
*Assistant Examiner* — Abdullahi Nur
(74) *Attorney, Agent, or Firm* — Haynes and Boone LLP

(57) ABSTRACT

A sensor system for remote object detection, tracking, characterization, and discrimination can have a plurality of sensors. A shared optical train that can facilitate blending of information from the sensors, so as to provide a single view for the plurality of sensors. Small and/or dim objects can be more readily detected. High-resolution 3 dimensional space object imagery and on-demand target information gathering can be provided with reduced data latency. The undesirable effects of atmospheric turbulence along the aiming direction can be mitigated even when there is a high relative velocity between the surveillance platform and remote target.

9 Claims, 7 Drawing Sheets

| SYSTEM | | | | DETECTION | | | TRACKING | IMAGING (SOI) | |
|---|---|---|---|---|---|---|---|---|---|
| Band | Size (m) | Signal Bandwidth Mhz/% | | Range (Single Pulse) (km) | Beamwidth / Cross Range Resolution | Down Range Resolution (m) | Varying Range (pulse Integration) (km) | Cross Range ISAR (cm) | Down Range (cm) |
| L/S | 10 | 1 / 0.05 | | 350 | 1 deg / 1.7 km @1000 km alt | 150 | 1000 | 10 | 30 Spot ISAR |
| | | 20 / 1 | | 170 | | 7.5 | 460 | | |
| X | 15 | 1 / 0.001 | | 3500 | 0.12 deg / 0.2km@1000 km alt | 30 | 8200 | 3 | 30 Stretched Pulse |
| | | 500 / 5 | | 650 | | 0.3 | 1750 | | |
| Laser Tracking | | | | 2000 | <1 urad / 0.1-0.03 m | <0.01 | 2000 | 3-10. | <0.1 |
| Multi-Spectral Imaging | | | | 2000 | Variable / N/A | N/A | 2000 | 30 | N/A |

FIG. 3

INTEGRATED MULTI-SENSOR SURVEILANCE AND TRACKING SYSTEM

PRIORITY CLAIM

This patent application claims the benefit of U.S. provisional patent application Ser. No. 60/908,326, filed Mar. 27, 2007, and entitled ADVANCED INTEGRATED MULTI-SENSOR SYSTEM FOR SPACE SITUATION AWARENESS, the entire contents of which are hereby expressly incorporated by reference.

GOVERNMENT RIGHTS

This invention was made with Government support under Contract No. FA9453-05-C-0031 awarded by the U.S. Air Force. The Government has certain rights in the invention.

TECHNICAL FIELD

The present invention relates generally to optics. The present invention relates more particularly to the use of a shared optical train in such applications as laser tracking, advanced visible imaging, and infrared search and track (IRST) technologies.

BACKGROUND

The Basic Aerospace Doctrine of the United States Air Force specifies aerospace control as the key mission that is associated with the core competence of air and space superiority. This Doctrine requires that the Air Force gain and maintain dominance of space through its control thereof.

This mission can be divided into three categories: space surveillance, protection, and negation. Although defensive counterspace operations (DCS) and offensive counterspace operations (OCS) are the pillars of space dominance and superiority (SDS), Space Situation Awareness (SSA) serves as the base for their effective functioning.

Thus, the accomplishment of the space dominance and superiority mission relies on the combination of intelligence, surveillance and reconnaissance (ISR), together with real-time communication and information processing technologies that are the major enablers of this mission. Therefore, progress in system development that provides better and more effective Space Situation Awareness enhances the capabilities in space dominance and superiority and is desirable.

BRIEF SUMMARY

Systems and methods for object/event detection, tracking, characterization, identification, and discrimination are disclosed. Examples of embodiments are suitable for use in ground based, marine based, submarine based, airborne, and space borne applications.

More particularly, in accordance with an example of an embodiment a sensor system can comprise a plurality of sensors and a shared optical train. The plurality of sensors and the shared optical train can be configured to facilitate fusion of information from the sensors so as to provide manifold information derived from the plurality of sensing elements from within a single sight on a target.

In accordance with an example of an embodiment, an advanced integrated multi-sensor system (AIMS) can comprise a shared optical train that is configured to cooperate with a laser tracking system, a visible imaging system, and an infrared search and track system so as to provide an integrated multi-sensor system. The AIMS can be used for detection, tracking, characterization, discrimination of an object of interest in space, air, marine or submarine environment In accordance with an example of an embodiment, an AIMS can comprise a plurality of sensors and a shared optical train. The shared optical train can be configured to facilitate the most effective and reliable fusion of the data from multiple various sensors so as to provide a single observation angle (sight) for the plurality of sensing elements and thus facilitate an enhanced ISR capabilities This invention will be more fully understood in conjunction with the following detailed description taken together with the following drawings.

BRIEF DESCRIPTION OF THE DRAWINGS

FIG. 3 is table of examples of accuracies for different sensor modalities according to an example of an embodiment;

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
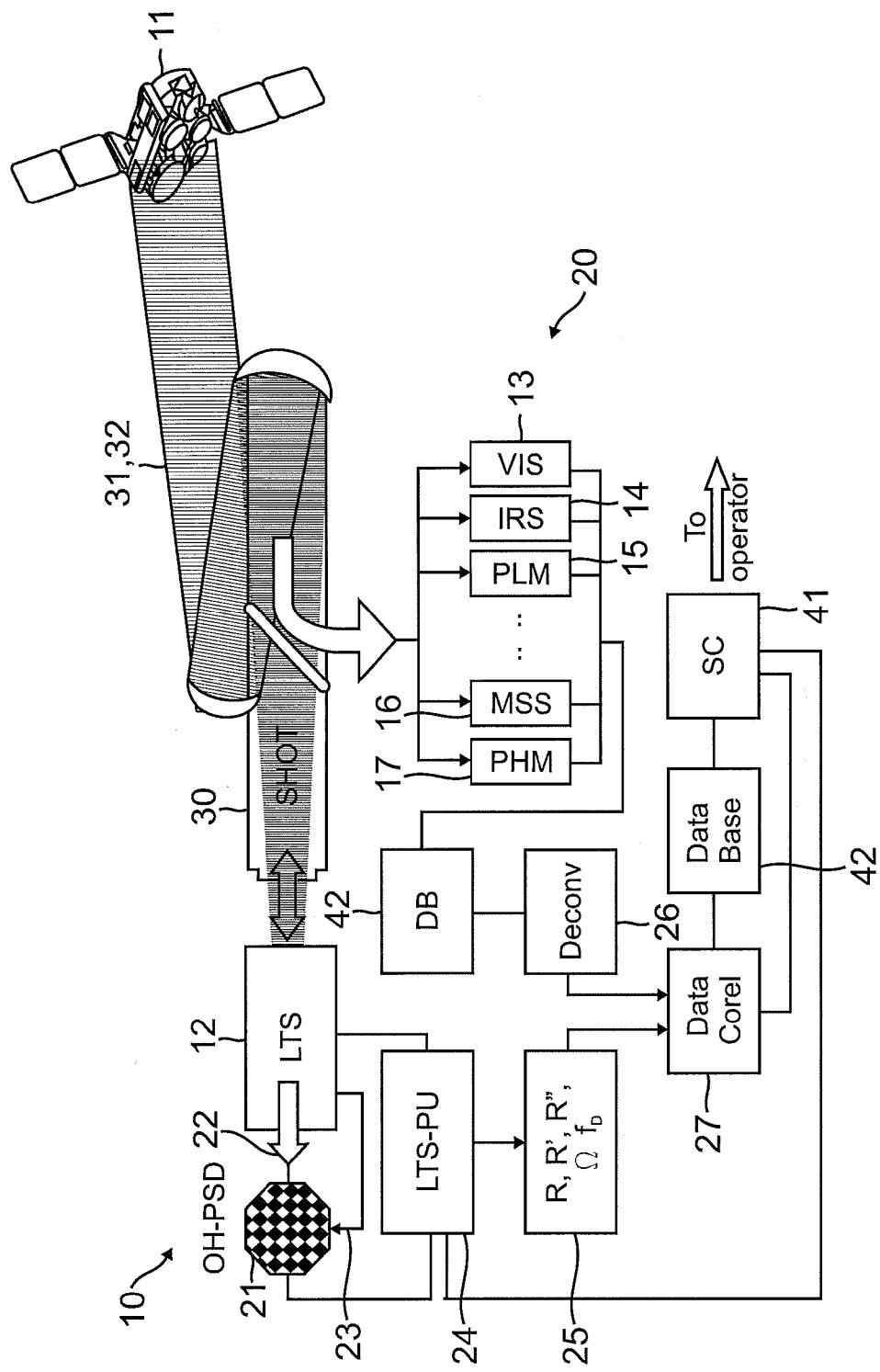
FIG. 1 is a semi-schematic drawing of a long range AIMS according to an example of an embodiment.

Modern space surveillance systems are typically either distributed or collocated sensor modules. Thus, such surveillance systems are not capable of providing a comprehensive set of surveillance measures for accurate target characterization and consistent track association for multiple various standard data sources.

For example, the effectiveness of imaging sensors in detecting passive (non-radiating) space objects commonly depends on sun illumination. As such, Earth eclipsed targets are less detectable.

The fusion of data according to nowadays practice suffers from inherent deficiencies. Data derived from distributed or collocated sensors can be difficult to match for various reasons, including incompatible observation conditions, variant parallax registration, observation angle and scaling factors, and deficiency in a common time standard resulting in significantly in track association.

Difficulty may encounter in the data fusion process, such as in the superposing of target features accurately. Indeed, post processing of time and space partitioned data sources with uncertainty in data delay may render the outcome deficient or unusable.

Surveillance in general, and space surveillance in particular, requires capabilities for detection, tracking, imaging, and characterization of remote objects with their characteristics that are not distinct. In general, most current space surveillance systems are not capable of generating the desired tracking accuracy, and providing required object characterization because they are single sensor based.

According to an example of an embodiment, an AIMS for enhanced space surveillance capability mitigates such deficiencies. The AIMS can utilize active laser tracking and multiple spectral domain (such as visible and multi-band infrared) sensing to provide high-resolution tracking, three-dimensional imaging, and reliable characterization of space objects.

To achieve responsive and enhanced surveillance performance, an example of an embodiment of an AIMS can comprise a suite of sensors having responses that tend to span a broad spectral range. These sensors can operate through a shared optical train. The shared optical train can integrate an active laser tracking system (ALTS) module, visible and multi-band infrared sensors (near infrared, medium wavelength infrared, and/or long wavelength infrared) to provide a rich set of simultaneous surveillance measures that enable high-resolution tracking and/or imaging, as well as robust characterization of space targets. By performing operations using a shared optical train, data reliability can be enhanced and near real-time target characterization can be achieved with reduced data latency.

More particularly, the methods and systems can be used to enhance capabilities in space situation awareness. The methods and systems can also be used for surveillance of ground based, marine based, submarine based, airborne and/or space borne targets. Embodiments can be ground based, marine based, submarine based, airborne and/or space borne. Depending upon its architecture, integration level and operational parameters AIMS can perform surveillance at various ranges from short range (less than 100 km) to long (LEO and GEO).

Effective Space Situation Awareness operations and space surveillance, in particular, can provide the capability to detect, discriminate and identify both launched and space objects, detect their operational events, and determine their capability to threaten friendly systems. Tracking, pointing, and discrimination (TPD) of objects in space becomes increasingly important as advances in aerospace technology lead to ever more reliance on space systems, as well as the potential for use of such systems by adversaries. Tracking, pointing, and discrimination serves space surveillance in support of force enhancement, force application and space control missions and can be considered as a critical component of a comprehensive Space Situation Awareness and counterspace system command, control, communications, computers, intelligence, surveillance, and reconnaissance (C4ISR).

Existing approaches to tracking, pointing, and discrimination involve a complex suite of interacting systems based on such technologies as radar, passive laser tracking, passive optical sensing, passive infrared sensing. These technologies include photogrammetry, polarimetry, and multispectral imaging.

However, contemporary space surveillance capabilities do not adequately meet the desired needs such as small/dim object detection, event and threat detection and characterization, high-resolution space object imagery, including 3D imagery, and on-demand information gathering with robust target characterization. This insufficiency comes mostly as a result of the great technical challenges involved, including large operational range, needed hemispherical range and rapid search, responsive operation, and multiple-sensor data fusion.

In addition, the prospect of using space-based platforms adds additional requirements for the form factor and power budget. Laser-based methods allow addressing most of these technical challenges, particularly the large distance to the space object and its high velocity relative to the surveillance platform. Examples of embodiments facilitate near real-time operation, reliable target characterization, and compensation for atmospheric turbulence, which improve image quality.

An example of an embodiment can enable monitoring the 9D state vector (spatial coordinates R{x, y, z}, velocity R', and acceleration R") of a remote, fast moving, and maneuvering object or cluster of objects, as well as assessing characteristics of the object's vibration spectrum. The active laser tracking technique that facilitates coherent detection module, uses optical phase conjugation (OPC) to enhance tracking accuracy and pointing stability, provides amplification of a weak object-returned coherent radiation, and allow for compensation of the turbulent atmosphere aberrations of the transmitted laser beam. The latter two being critical problems in coherent optical tracking, pointing, guiding, imaging and discrimination of remote objects.

Unlike adaptive optics (AO) and software-based post-processing techniques, optical phase conjugation operates inherently at an extremely high speed. This speed advantage is especially crucial for high-angular velocity objects such as those in the low earth orbit (LEO). Image-based active laser tracking has also been demonstrated previously for boost-phase ballistic missile tracking with adaptive optic correction, and an optical phase conjugation enabled imaging/tracking technology could simultaneously address both the tracking and discrimination problems. Although the Adaptive optics techniques do not perform well at high-frequency, it does enable correcting large-magnitude atmospheric aberrations. Thus, the combination of adaptive optics and optical phase conjugation can improve imaging operations in space surveillance because it provides a capability to preset the receiving optics for better correction of distortions.

The inherent complexity, required speed, and enormity of the decision-making process for tracking, pointing, and discrimination systems essentially forbids reliance on a single sensor surveillance system because of numerous possible complications. These complications include the vast range of weather, atmosphere and engagement scenarios that must be accommodated. Surveillance systems must begin characterization of the object as early as possible with whatever information that can be gleaned from all of the available sensors, and the retrieved data must be continuously updated and fused with other sensor information.

An example of an embodiment comprises an AIMS for space situation awareness. The AIMS can integrate in a shared optical train laser tracking with visible imaging and infrared search and track technologies to produce an AIMS for space object detection, tracking, characterization, discrimination and event detection, which enhance the capabilities of present surveillance systems.

According to an example of an embodiment, the radio frequency (RF) radar can provide the initial state vector and cueing information for further surveillance. Because like the radar, AIMS employs an active tracking technique (by using the active laser tracking module) it can operate in both day and night. As such it can facilitate "dark pass" tracking of satellites through the Earth's shadow.

According to an example of an embodiment, active (laser) illumination of an object under surveillance can facilitate optical signal gating. As those skilled in the art will appreciate, gating the optical signal can substantially enhance the signal-to-noise ratio in an acquired dataset. These data that includes manifold of information on the object (imaging, multi-spectral, IR, polarimetric, etc) can be strongly diagnostic of the object's composition and can be of great utility in identifying objects. According to an example of an embodiment, an integrated system with a single illumination source can provide substantially the same functionality as a suite of distributed or collocated systems.

Another advantage of having these various multiple sensors integrated on the platform with controlled active illumination is that it facilitates more reliable data fusion. As those skilled in the art will appreciate, data fusion represents a major thrust in defense applications and has received much attention in recent years.

Active illumination facilitates accurate synchronization of several data streams and a shared optical train ensures that the data is referenced to a common coordinate system. As an added advantage, an integrated system can reduce the number of required target acquisition handoffs, an error-prone process that tends to slow the response of the tracking system in time-critical applications.

An example of an embodiment can comprise a single platform, multiple sensor system that allows for multi-functional operations (target identification and characterization, plus event and threat detection), it can be worthwhile to miniaturize the complete system to enable space deployment. Construction of a compact, space deployable module can achieve the system goals for operations inside a one hundred kilometer range.

An example of an embodiment can support not only space object tracking, but can also enhance identification and discrimination capabilities by retrieving the specific features associated with the vibration spectrum of the target. Thus, one or more embodiments can fuse separate components of tracking, pointing, and discrimination in a single instrumental design, moving the spirit of the unified tracking, pointing, and discrimination concept into a technical reality.

Figure 7:
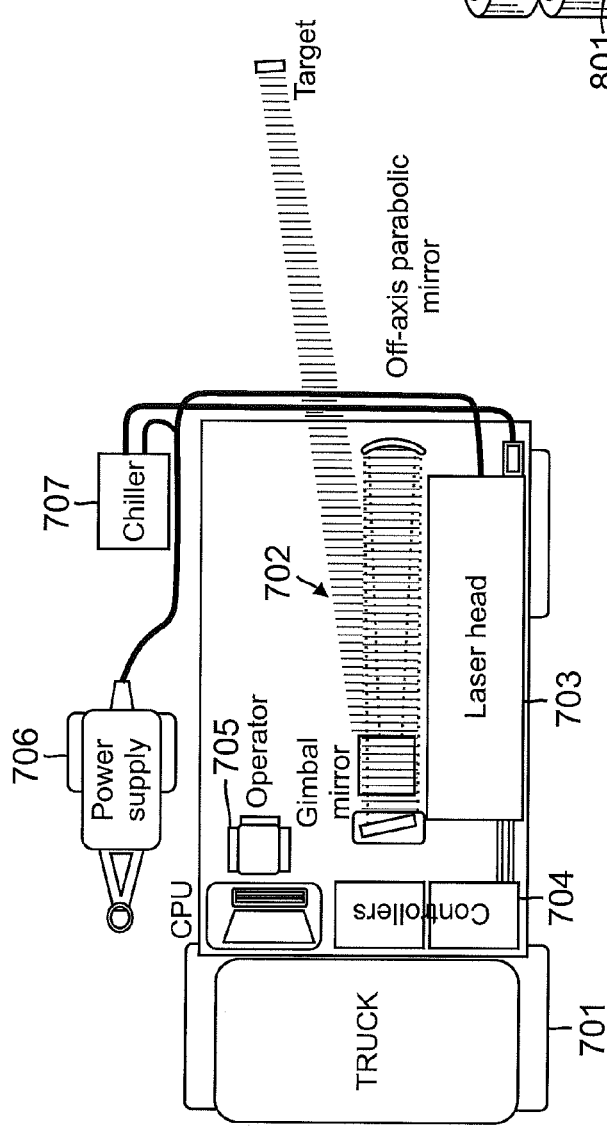
FIG. 7 is a semi-schematic drawing of a ground based long range AIMS according to an example of an embodiment.
Figure 8:
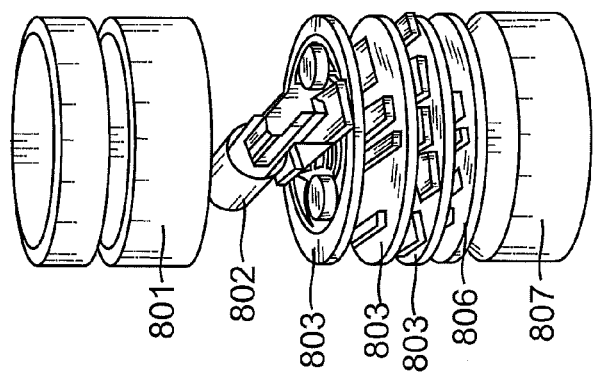
FIG. 8 is a semi-schematic drawing of a space based long range AIMS according to an example of an embodiment.

Referring now to FIG. 1, an example of an embodiment of an AIMS 10 can comprise multiple sensors. The AIMS 10 uses a common (shared) optical train (SHOT) 30 to facilitate the use of the multiple sensors to sense various different parameters relating to a target 11, such as a space based, airborne, ground, marine or submarine object under the surveillance For example, the AIMS 10 can comprise one or more laser tracking systems (LTS) 12 that exemplifies coherent sensor module and a plurality of incoherent sensor modules 20. The platform with integrated sensor modules 20 can comprise one or more visible-light sensors (VIS) 13, and one or more infrared sensors (IRS) 14, one or more polarimetric (PLM) sensors 15, one or more multi-spectral imaging systems (MSS) 16, and one or more photogrammetry (PHM) sensors 17 which are co-located on a single platform (FIGS. 7 and 8). Other sensors can be included, if desired.

According to an example of an embodiment, the AIMS can operate independently, i.e., without external systems such as a large optical telescope, radio frequency (RF) system, or a super computer for multi-platform data fusion. According to an example of an embodiment, the AIMS can operate cooperatively, i.e., by grouping with external systems, such as a large optical telescope, RF system, or a super computer for multi-platform data fusion.

According to an example of an embodiment, the laser module can retrieve key features of the target, such as the 9D (9 dimensional) state vector 25 (spatial coordinates R{x, y, z}, velocity R', and acceleration R") and/or the spectrum of the object's mechanical vibrations ($\Omega$). The spectrum of the object's mechanical vibrations can be obtained by measuring the Doppler frequency shift $f_D$ of the returned signal. The integration of the infrared and visible channels with the laser tracking channel and parallel data fusion allows for improved identification of the target signature.

The shared optical train 30 can direct a laser beam 31 toward the object 11 and can collect object-scattered radiation 32. This collected radiation 32 can be the scattered laser (coherent) radiation from the target 11, as well as passive scattered incoherent radiation (both visible and infrared) and thermal emission from the target. Thus, the radiation 32 can be the radiation that is reflected by the target 11 and can be the radiation that originates and emitted from the target 11.

This collected radiation 11 is transmitted through the shared optical train 30. After passing the shared optical train 30, the radiation 32 from the target 11 can be split into coherent and incoherent parts. The coherent radiation 32 can be directed to the coherent detection unit, where it can be amplified and fed into an optical heterodyne (or homodyne) position sensitive detector (OH-PSD).

Collected and amplified coherent radiation 11 can be mixed with a reference signal 22. The reference signal can be provided by a local oscillator, such as a local oscillator of the laser tracking system 12.

Information representative of the mixed signals can be provided to a laser tracking system processing unit (LTS-PU) 24. The LTS-PU 24 can use this information to determine spatial, angular, dynamic, and vibration characteristics of the target 11 according to well known principles.

Specific features of the object under surveillance can be detected by using a set of imaging and spectral sensors, such as visual imaging sensor(s) 13, infrared imaging sensor(s) 14, multispectral imaging system(s) 16, polarimetric sensor(s) 17, and/or photogrammetry sensor(s) 17. Data retrieved from such sensors, after processing such as fusion and deconvolution 26, can then be compared with data from the optical heterodyne position sensitive detector 21 and can be the then sent to data synchronization module (SC) 41 to synchronize data flow from various sensors and that stored at data base 43 for posterior data fusion. Data correlator 27 correlates the data from coherent detector platform (12, 21, 24) providing 9D state vector 25 data and correlating them with data from incoherent set of the sensors (20) through the data buffer 42 to facilitate reliable target identification.

Figure 2:
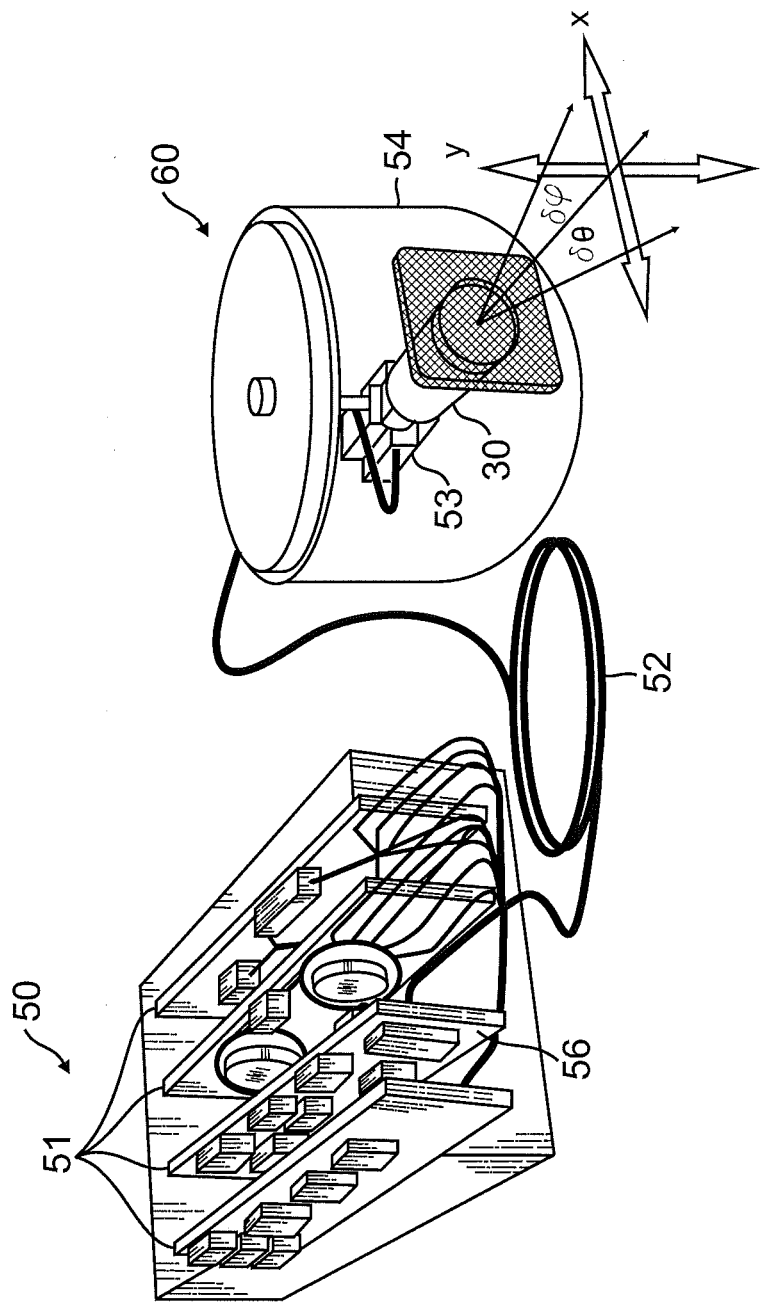
FIG. 2 is a semi-schematic drawing of an integrated surveillance system, according to an example of an embodiment.

Referring now to FIG. 2, according to an example of an embodiment, a compact, integrated surveillance system 50 can be suitable for operating in a space environment performing the proximity defense operation.

More particularly, such a system can comprise a plurality of modules 51. For example, the system 50 can comprise modules for laser ranging, tracking, and designation. Such modules can share an optical train with visible-light and thermal imaging modules. The system 50 can contain modules for system control, communications (such as a receiver and/or transmitter), and data processing. The system 50 can comprise a laser and modulation drive modules.

The system 50 can comprise a master oscillator power amplifier (MOPA) fiber laser module 56. The laser of the master oscillator power amplifier fiber laser module 56 can provide laser radiation via a fiber 52 to an optical head 60. The optical head 60 can contain the shared optical path 30 of FIG. 1. The shared optical train 30 can be articulated, such as via X-Y drive 53. The shared optical train 30 can be disposed with an enclosure 54.

According to an example of an embodiment, the AIMS laser can provide monitoring, in real time, of the spatial distribution of atmospheric turbulence. As those skilled in the art will appreciate, atmospheric turbulence is an important consideration for a number of applications such as free-space communication, high energy laser beam delivery, and distortion compensation for through-atmosphere imaging systems.

The Space Situational Awareness mission is increasingly important as it provides a thorough picture of the space operational environment. This segment of the Space Control Mission can allow for detecting, precisely tracking, identifying and discriminating adversary space systems that could threaten U.S. space systems or place U.S. combat forces at risk by detecting their locations and movements. Successful performance is based on a combination of precision passive and active tracking techniques and very-high-resolution imaging technologies to provide extremely detailed information on adversary space systems, information sufficient to enable defensive and offensive counterspace operations ranging from denial (D1), through disruption (D2), degradation (D3), and destruction (D4).

Currently, passive satellite characterization uses optics technology to portray the satellites by collecting radiation reflected off or emitted by satellites in different spectral domains (visible, infrared, thermal imaging, etc). Substantial improvement in image resolution was made possible by using the 3.6-meter telescope with an advanced electro-optical system to compensate the image degradation due to atmospheric turbulence.

Infrared imagers and radiometers coupled to the telescopes produce images and collect thermal data on satellites, both day and night, and provide tracking information. By coupling information from the visible light sensor with adaptive optics, the images of satellites with a spatial resolution of 10 cm at 500 km can be obtained during sunrise and sunset terminator periods. A major deficiency of this system is, however, its reliance on a single sensor.

One of the important deficiencies of contemporary space surveillance capabilities is reliance on passively imaged, sun-illuminated objects. Incorporating new laser-based technologies allow upgrading this type of system to active characterization. The technologies of laser tracking and imaging can result in better identification capabilities, better cross-range and down-range resolution, as well as target discrimination. The latter is of special importance when the space target represents a potential threat, such as a reentry vehicle. Integration and fusion of the data received from new active laser tracking systems and existing passive systems facilitate the improved discrimination of the adversary's space surveillance systems and help determine the requirement needed to disrupt their effective operation.

To satisfy the Space Situation Awareness needs and requirements an optimal AIMS can provide a number of parameters that are of importance for efficient space surveillance. This can include the 9D state vector (i.e. distance to the target, its velocity, and its acceleration) and the spectrum of the space object's mechanical vibration, as well as its image in different spectral domains with reasonable resolution. While imaging of the object can be performed with passive sensors (photogrammetric, multi-spectral, thermal, polarimetry and others), the vital information on the state vector and vibration monitoring can be achieved only by using an active laser tracking technique.

Data collected from multiple incoherent sensors in different spectral regions (infrared, visible) and at different illumination conditions facilitates more reliable track association and as such enhances surveillance capabilities. A hidden activity that may not be noticeable on a visible spectral range can be much better detectable in a short or long-wave infrared (thermal) imager. Thus, fused data from visible and IR sensors can provide enhanced surveillance efficiency, and being fused with data from an active laser-tracking module can significantly improve space surveillance capabilities. A shared optical train provides more effective data fusion and track association as it serves for getting a single view for all sensing elements of the system.

The initial state vector and cueing information can be provided by conventional radars. Because the AIMS uses an active tracking technology, it can operate in both day and night and for "dark pass" tracking of satellites through the Earth's eclipsed zone. Additionally, active illumination of the object under the surveillance provides a means for optical signal gating, which can greatly enhance the signal-to-noise ratio in an acquired image. Imaging data that includes multi-spectral information can be used for identifying the composition of the targets what is of great utility for discrimination purposes.

According to an example of an embodiment, an integrated system with a single illumination source provides substantially the same functionality as a collection of the detached and distributed sensors. More than one illumination source can be provided, if desired.

Another advantage of having sensors suite on a single platform with controlled active illumination is to facilitate data fusion. Active illumination allows accurate synchronization of several data streams, and a shared optical train ensures that the data is referenced to a common coordinate system and clock. As an added advantage, an integrated system can reduce the number of required target acquisition handoffs, an error-prone process that tends to slow the response of the tracking system in time-critical applications. An example of an embodiment can comprise a single platform, multiple sensor system that allows for multi-functional operations such as target identification, target characterization, event detection, and threat detection. Such an example of an embodiment can be configured for space deployment.

According to an example of an embodiment, the AIMS can operate independently. Alternative, an example of an embodiment can work cooperatively, such as by grouping with other "external" systems, such as a large optical telescope, radio frequency radar system, or a supercomputer for multi-platform data fusion.

According to an example of an embodiment, the active laser tracking system module of the AIMS can determine key features of the target, such as the 9D state vector (spatial coordinates R{x, y, z}, velocity R', and acceleration R"), as well as the spectrum of the target's mechanical vibrations. Integration of the IR and visible imaging channels with the laser tracking channel and parallel data fusion allows for improved identification of the target signatures.

Referring now to FIG. 3, a chart is provided that shows examples of parameters of an example of an embodiment of the AIMS with self-steering, active laser tracking system for tracking, pointing, and discrimination operations. Such an example of an embodiment can facilitate of monitoring the 9D state vector of a remote, fast moving, and maneuvering target or cluster of targets, as well as assessing characteristics of the target's vibration spectrum.

An example of an embodiment can facilitate not only space object tracking, but can also enhance identification and discrimination capabilities by retrieving the specific features associated with the vibration spectrum and thermal distribution of the target.

Figure 4:
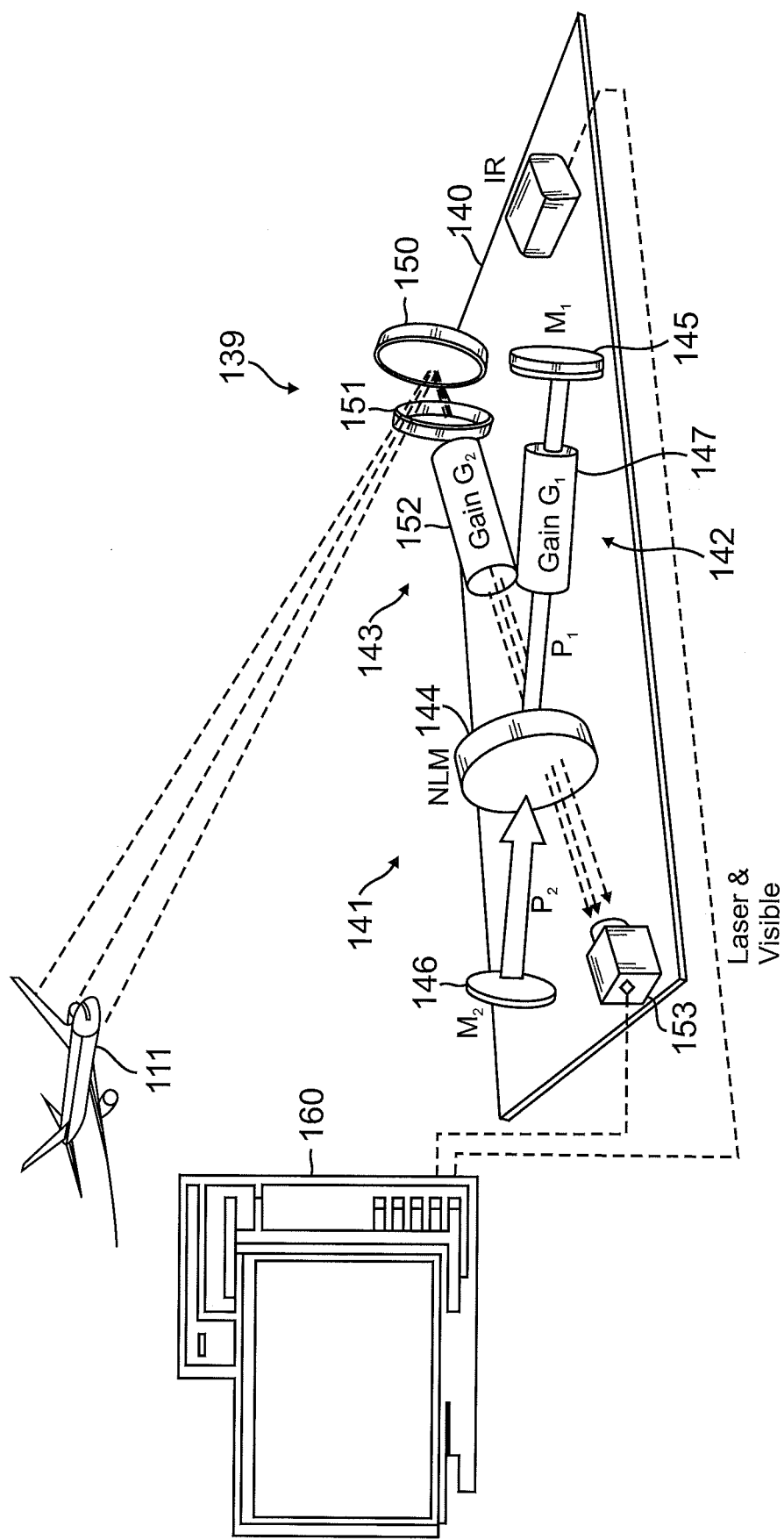
FIG. 4 is a semi-schematic drawing of a laser tracking platform of the AIMS according to an example of an embodiment.

Referring now to FIG. 4, according to an example of an embodiment an AIMS 139 is substantially self-contained on a common platform 140. As discussed herein, the long range the AIMS 139 can be ground based, marine based, submarine based, airborne, or spaceborne. For example, the platform 140 can be a truck (FIG. 7), a railway car, a ship, a submarine, an aircraft, a missile, a rocket, a satellite, or a spacecraft (FIG. 8).

The LTS 139 can comprise share optics 141. The share optics can comprise a first optical path 142 and a second optical path 143 having shared components, i.e., a non-linear mirror (NLM) 144. For example, the first optical path 142 can comprise a first mirror (M1) 145, a second mirror (M2) 146, and a gain medium (G1) 147, while the second optical path 143 can comprise an gimbaled or pointing mirror 150, optics 151, a gain medium 152, and at least one sensor or imager 153. The first optical path 142 can provide laser radiation for active illumination, such as for imaging and tracking. The second optical path 143 can define an amplifier for amplifying coherent radiation received from the target 111. The first path 142 and the second path 143 can be substantially along the same optical axis or can be along different optical axes.

The delay time for radiation transmitted from the AIMS platform 139 to the target 111 and for radiation reflected from the target 111 back to the long range AIMS 139 provides information from which the distance from the long range AIMS 139 to the target 111 can be determined by computer 160. The Doppler shift of such radiation provides information from which the velocity of the target 111 can be determined by computer 160. Aiming of the long range AIMS 139, such as aiming of the pointing mirror 150 thereof, provides information from which the spatial/angular coordinates of the target can be determined by computer 160.

Figure 5:
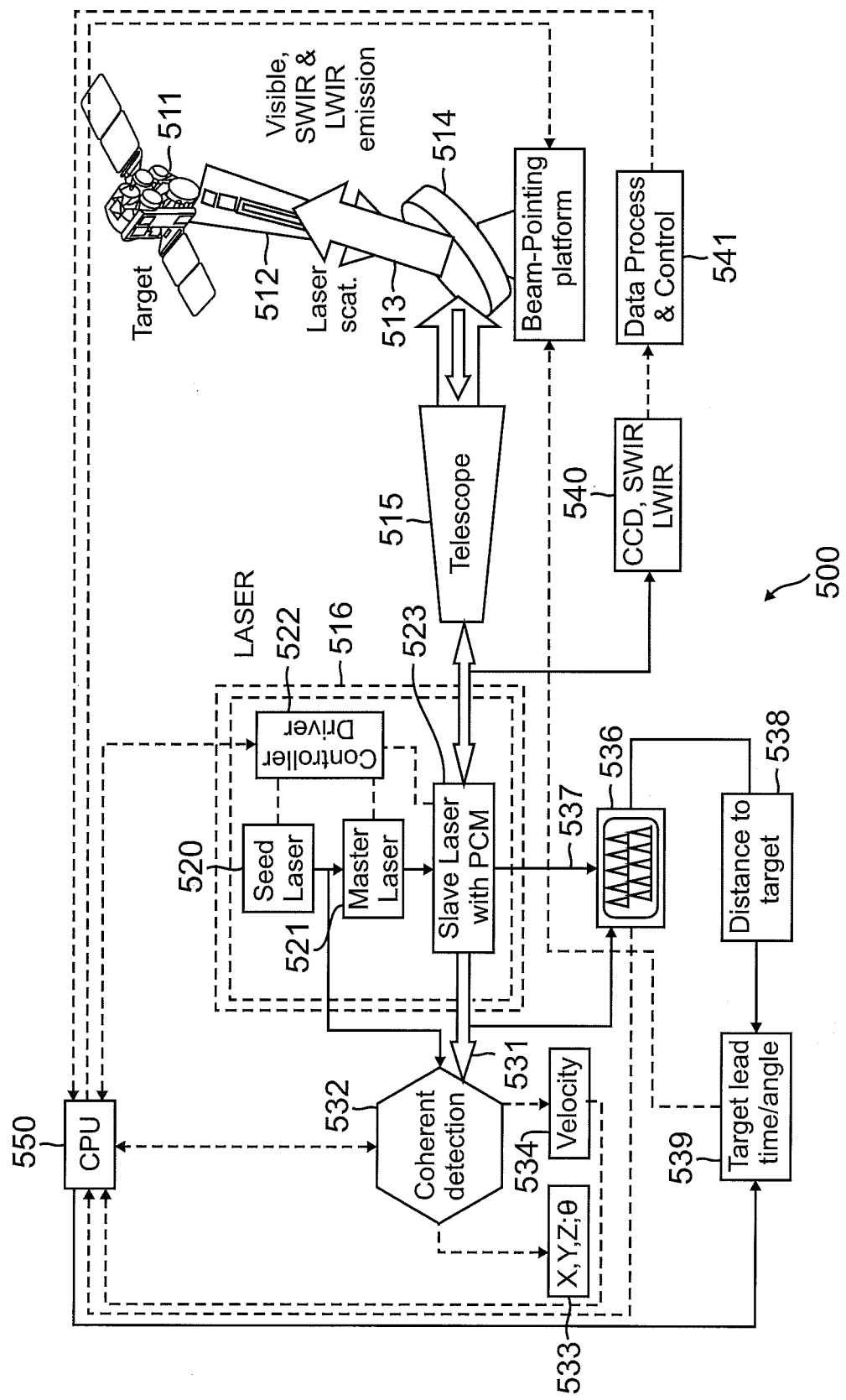
FIG. 5 is a block diagram of a long range AIMS according to an example of an embodiment.

Referring now to FIG. 5, according to an example of an embodiment a long range AIMS 500 uses visible, short wavelength, and long wavelength emissions from target 511 to determine parameters such as target identification, target location, target velocity, and target acceleration. The emissions 512 include laser scattering from the target 511 that can be caused by directing laser radiation 513 from laser 516 to the target 511 via telescope 515.

Telescope 515 can define at least a portion of a shared optical system, such as shared optical system 30 of FIG. 1. The shared optical system processes both radiation that is directed from the long range AIMS 500 to the target 511 and radiation from the target 511 that is gathered by long range AIMS 500.

The laser radiation 513 can be aimed toward the target 511 by beam pointing platform 514 which can comprise a gimbaled mirror. Beam pointing platform 514 can also direct emissions from the target 511 into the telescope 515. Thus, telescope 515 functions bidirectionally.

The laser 516 can comprise a seed laser 520 that seeds a master laser 521, both of which can be controlled by control driver 522. The master laser 521 can provide radiation to slave laser 523. Slave laser 523 can modulate laser radiation, such as with pulse code modulation (PCM) so as to provide pulses that are suitable for use in laser ranging.

The slave laser 523 can receive laser scattering 512 from the target 511 and can amplify this scattered coherent radiation. The amplified radiation 531 can be provided to coherent detector 532 for detection. The detected signal derived from the amplified radiation 531 can be used to determine state vector information 533 such as x,y,z position and/or angular position Θ. The detected signal derived from the amplified radiation 531 can also be used to determine state vector information 534 such as velocity and acceleration.

The amplified radiation 531 can be compared to a reference signal 537 by comparator 536 to determine distance 538 to the target 511. The distance 538 to the target 511 can be used to determine target lead time/angle 539 so as to facilitate tracking with beam pointing platform 514.

One or more sensors 540, such as a charge coupled device (CCD), short wavelength infrared sensor, and/or a long wavelength infrared sensor, can receive radiation from the telescope 515. The sensors 540 can provide information to data process and control 541. Data process and control 541 can process the information from the sensors 540 and provide processed information to computer 550 for use in determining target lead time/angle 539, as well as for controlling the coherent detector 532 and the beam pointing platform 514. The computer 550 also receives state vector information 533, 534 information from the coherent detector 532 and the controller driver 522 to facilitate the determination of target lead time/angle 539, for controlling the coherent detector 532 and for controlling the beam pointing platform 514.

Figure 6:
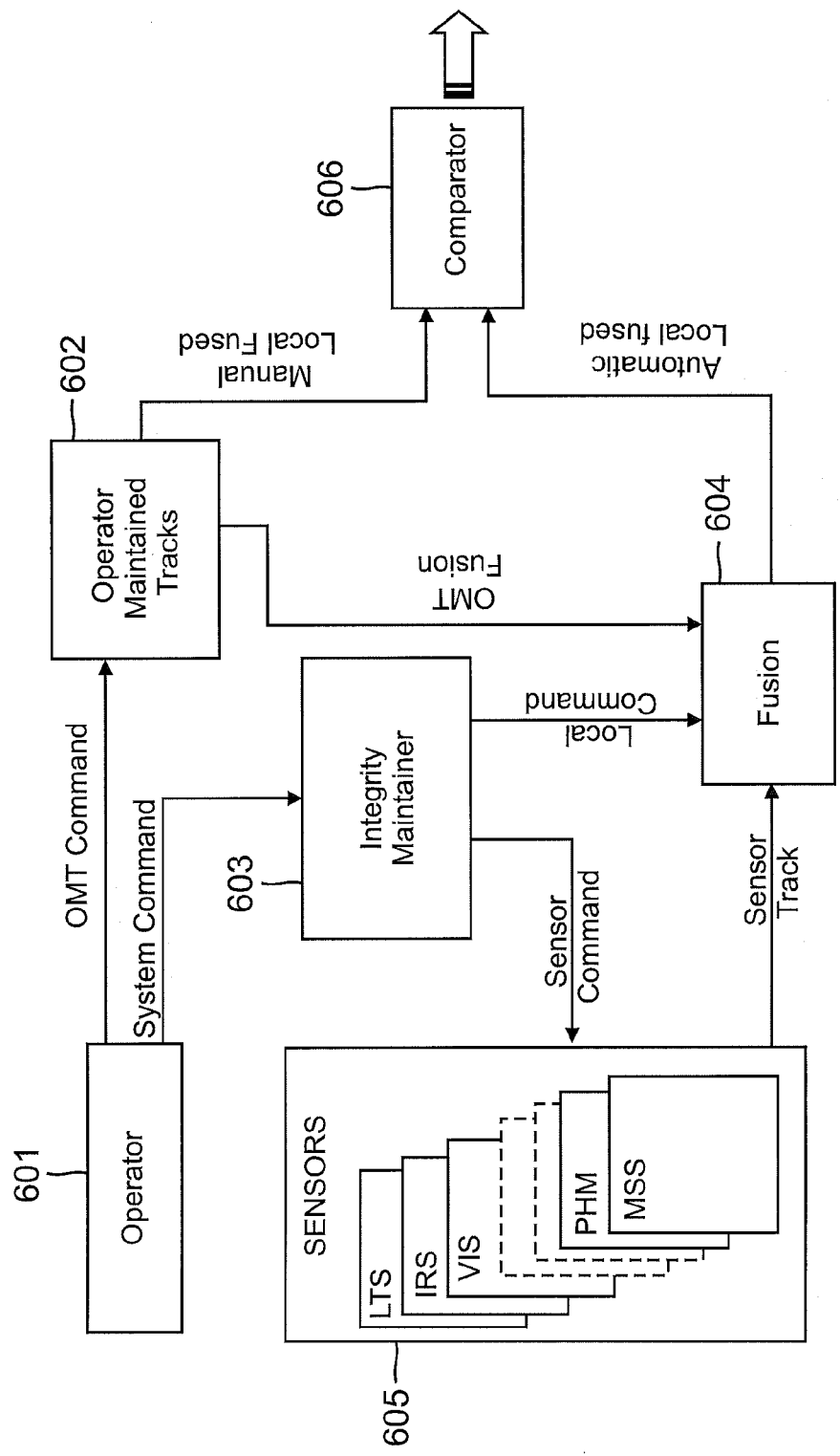
FIG. 6 is a chart showing local sensor data fusion architecture according to an example of an embodiment.

Referring now to FIG. 6, a chart shows a typical for local sensors data fusion architecture according to an example of an embodiment. An Operator 601, which can be either a person or an automated computer unit, provides control of the data fusion system. For example, the operation can provide operator maintained tracks (OMT) commands to an operator maintain tracks system or database 602 and can provide system commands to an integrity maintainer 603.

The operator maintained tracks or database 602 can contain information regarding potential targets. This information can be used to facilitate the identification of targets. The integrity maintainer 603 can determine what data is useful and can control the fusion 604 process such that only useful data is used therein. The integrity maintainer can thus control which sensors 605 provide data to the fusion 604 process. For example, if it is determined that data from a visible light sensor is not useful, e.g., is corrupt or lacks sufficient resolution, then the integrity maintainer 603 can cause such data to be omitted from the fusion process.

A comparator 606 can use fused data to data from the operator maintained tracks or database 602 to facilitate target identification. Thus, when the fused sensor information from fusion 604 substantially matches information stored in the operator maintained tracks or database 602, then it can be determined that the target being tracked by the AIMS is like to be the same as or related to the associated item of the operator maintained tracks or database 602.

Referring now to FIG. 7, according to an example of an embodiment a ground based AIMS can be deployed on a ground based platform, such as a truck 701. For example, a truck 701 can carry a shared optical train (such as shared optical train 30 of FIG. 1), a laser head 703, and controllers 704 for controlling the integrated multi-sensor system. An operator 705, such as a human operator or a computer operator, can also be on the truck 701.

A power supply 706 and a chiller 707 can be located either on the truck 701 or off of the truck 707. The chiller 707 can be used to cool the laser head 703.

Referring now to FIG. 8, according to an example of an embodiment a space based long range AIMS can be deployed on a space base platform, such as a missile, rocket, satellite, or spacecraft. The AIMS can comprise a transmission port 801 that transmits radiation from the AIMS toward the target and that receives radiation from the target and provides the radiation to the integrated multi-sensor system.

A shared optical train 802 both provides radiation to the target and receives radiation from the target, as discussed herein. A laser tracking system 803 facilitates tracking of the target, as discussed herein. A receiver/processor receives information from sensors and/or imagers of the AIMS and processes this information so as to facilitate data fusion, as discussed herein.

An on-board power supply 807 provides electrical power for the AIMS. The power supply 807 can comprise batteries, solar panels, and/or radiothermal generators, for example.

Improved capabilities in detecting, tracking, imaging and characterization of space objects can be provided by examples of embodiments. More particularly, examples of embodiments facilitate the detection and tracking of small and/or dim objects, as well as provide event and threat detection and characterization. High-resolution 3D space object imagery and on-demand target information gathering can be provided with reduced data latency. Hemispherical coverage, rapid search, responsive operation, and data fusion from multiple and non-identical sensors can be facilitated. Laser-based methods can mitigate effects of atmospheric turbulence along the aiming direction even when a high relative velocity between the surveillance platform and remote target is present.

Embodiments described above illustrate, but do not limit, the invention. It should also be understood that numerous modifications and variations are possible in accordance with the principles of the present invention. Accordingly, the scope of the invention is defined only by the following claims.

The invention claimed is:

1. A sensor system for characterizing a satellite, the sensor system comprising:
   a ground based laser source configured to illuminate the satellite while the satellite is in orbit around the Earth;
   a coherent detector configured to detect reflected laser light from the satellite as illuminated by the laser source;
   a plurality of different sensors including an infrared sensor configured to sense infrared light emitted by the satellite;
   a shared optical train including a telescope, the shared optical train being configured to facilitate fusion of data from the sensors and the coherent detector;
   an amplifier for amplifying coherent radiation received through the shared optical train from the satellite to provide amplified coherent radiation; and
   an optical heterodyne position sensitive detector configured to receive amplified coherent radiation from the amplifier.

2. The sensor system as recited in claim 1, further comprising:
   a local oscillator; and
   wherein the optical heterodyne position sensitive detector is configured to mix radiation from the local oscillator with the amplified coherent radiation.

3. The sensor system as recited in claim 1, further comprising:
   a local oscillator;
   wherein the optical heterodyne position sensitive detector is configured to mix the amplified coherent radiation with radiation from the local oscillator; and
   further comprising a processor configured to receive information from the optical heterodyne position sensitive detector and to determine spatial, angular, motional and vibration characteristics of the satellite.

4. The sensor system as recited in claim 1, further comprising:
   at least one imaging sensor;
   at least one spectral sensor;
   a processor; and
   wherein data from the imaging sensor(s) and the spectral sensor(s) is processed by the processor and used along with data from the optical heterodyne position sensitive detector to identify the satellite.

5. The sensor system as recited in claim 1, further comprising:
   a visual sensor;
   an infrared sensor;
   a multispectral sensor;
   a polarimetric sensor;
   a photogrammetry sensor;
   a processor;
   a computer;
   a database; and
   wherein data from the visual sensor, the infrared sensor, the multispectral sensor, the polarimetric sensor, and the photogrammetry sensor is blended and deconvolved by the processor and along with data from the optical heterodyne position sensitive detector is compared to information in the database by the computer to identify the satellite.

6. A sensor system for characterizing a satellite, the sensor system comprising:
   a ground based laser source configured to illuminate the satellite while the satellite is in orbit around the Earth;
   a coherent detector configured to detect reflected laser light from the satellite as illuminated by the laser source;
   a plurality of different sensors including an infrared sensor configured to sense infrared light emitted by the satellite;
   a shared optical train including a telescope, the shared optical train being configured to facilitate fusion of data from the sensors and the coherent detector; and
   a processing unit configured to determine a nine dimensional state vector of the satellite using information from the sensors.

7. The sensor system as recited in claim 6, wherein the processing unit is configured to determine a nine dimensional state vector of the satellite using information from the sensors and a spectrum of mechanical vibrations of the satellite.

8. The sensor system as recited in claim 6 wherein the spectrum of the mechanical vibrations is determined by measuring a Doppler shift of a return signal from the satellite.

9. A sensor system for characterizing a satellite, the sensor system comprising:
   a ground based laser source configured to illuminate the satellite while the satellite is in orbit around the Earth;
     a coherent detector configured to detect reflected laser light from the satellite as illuminated by the laser source;
     a plurality of different sensors including an infrared sensor configured to sense infrared light emitted by the satellite;
     a shared optical train including optical train being configured to facilitate fusion of data from the sensors and the coherent detector; and
     a processing unit and a radar configured to provide an initial state vector and cuing information and wherein the laser source is configured to facilitate active laser tracking such that dark pass tracking of the satellite is provided when the satellite passes through a shadow of the Earth.

* * * * *